US012598088B2

(12) United States Patent
Drias

(10) Patent No.: US 12,598,088 B2
(45) Date of Patent: Apr. 7, 2026

(54) SECURITY CO-ENGINEERING

(71) Applicant: Schneider Electric Systems USA, Inc., Foxborough, MA (US)

(72) Inventor: Zakarya Drias, Boston, MA (US)

(73) Assignee: SCHNEIDER ELECTRIC SYSTEMS USA, INC., Foxborough, MA (US)

( * ) Notice: Subject to any disclaimer, the term of this patent is extended or adjusted under 35 U.S.C. 154(b) by 371 days.

(21) Appl. No.: 18/217,018

(22) Filed: Jun. 30, 2023

(65) Prior Publication Data

US 2025/0007739 A1 Jan. 2, 2025

(51) Int. Cl.
H04L 9/00 (2022.01)

(52) U.S. Cl.
CPC ..................................... H04L 9/50 (2022.05)

(58) Field of Classification Search
CPC . H04L 9/50; H04L 67/06; H04L 67/12; H04L 9/3236; H04L 9/3297; H04L 2209/56; H04W 84/18; H04W 4/70
See application file for complete search history.

(56) References Cited

U.S. PATENT DOCUMENTS

| 10,725,803 | B1 * | 7/2020 | Zhu | .......................... | G06F 21/64 |
| 10,750,976 | B1 * | 8/2020 | McLane | ............... | A61B 5/7275 |
| 11,928,188 | B1 * | 3/2024 | McCown | .................. | H04L 9/50 |
| 12,393,664 | B1 * | 8/2025 | Liang | .................. | G06F 16/1805 |
| 2022/0027316 | A1 * | 1/2022 | DeLuca | .................. | G06F 9/542 |

OTHER PUBLICATIONS

He Sen et al., "BoSMOS: A Blockchain-based status monitoring system for defending against unauthorized software updating in industrial Internet of Things", IEEE Internet of Things Journal, vol. 7, No. 2, Oct. 15, 2025, pp. 948-959.
Pillai Akshay et al., "Securing firmware in internet of things using blockchain", 2019 5th International Conference on Advanced Computing & Communication Systems, Mar. 15, 2019, pp. 329-334.
Gang Wang, "SoK: Applying blockchain technology in industrial internet of things", International Association for Cryptologic Research, vol. 20210609:063146, Jun. 9, 2021, pp. 1-30.
Extended European Search Report for EP Application No. 24181994. 5, dated Oct. 14, 2024, 10 pages.

* cited by examiner

*Primary Examiner* — SM A Rahman
(74) *Attorney, Agent, or Firm* — Stinson LLP

(57) ABSTRACT

Method and system of securely delivering a digital file from a provider to an industrial control system. A provider node creates a blockchain contract having metadata relating to the digital file to be delivered and deploys the blockchain contract to a blockchain network for verification. A plurality of other provider nodes, serving as miners, verifies and validates the blockchain contract. If the verification is successful, the blockchain networks notifies an industrial control system node associated with the industrial control system to initiate downloading the digital file from a provider repository for distribution to at least one Industrial Internet of Things (IIoT) device of the industrial control system.

19 Claims, 3 Drawing Sheets

SECURITY CO-ENGINEERING

BACKGROUND

With cyberattacks on industrial control systems on the rise, industry awareness and interest in security in the supply chain has grown tremendously. In the context of process automation systems and projects customers, there are concerns about the different software delivered to the industrial control system (e.g., firmware, security patches, product updates, project files, etc.). Each provider or vendor of control system equipment interacts with multiple customers and each customer of control system equipment interacts with multiple vendors. And during the lifecycle of these interactions, an enormous number of files containing software, firmware, data, and the like must be shared. Conventional security measures for protecting the transactions, such as digital signing using certificates and cyclical redundancy checks (CRCs), are inadequate.

SUMMARY

Aspects of the present disclosure provide a blockchain-based security co-engineering system composed of providers' nodes and asset owners' nodes. A provider pushes its configurations into a blockchain network to be verified and validated by the other nodes of the blockchain. Once the verification is complete, a smart contract created for this data is added to the blockchain ledger. After the contract has been added to the ledger, the asset owner checks which of its assets are concerned by this update and pulls the firmware or other software from the provider's repository.

In an aspect, a method of securely delivering a digital file from a provider to an industrial control system includes creating a blockchain contract, which includes metadata relating to the digital file to be delivered and deploying the blockchain contract to a blockchain network for verification. The method also includes executing a verification of the blockchain contract and notifying an industrial control system node associated with the industrial control system of a successful verification of the blockchain contract. In response to the successful verification, the method comprises downloading the digital file from a repository coupled to a provider node associated with the provider to the industrial control system node and distributing the downloaded digital file to at least one Industrial Internet of Things (IIoT) device of the industrial control system.

In another aspect, a system for securely delivering a digital file from one or more providers to an industrial control system comprises a plurality of miner nodes coupled to each other via a data communication network and forming a blockchain network and a provider node associated with one of the one or more providers coupled to the miner nodes via the data communication network. The provider node is configured for creating a blockchain contract having metadata relating to the digital file to be delivered and deploying the blockchain contract to the miner nodes for verification. The system also comprises an industrial control system node associated with the industrial control system. The industrial control system node is coupled to the miner nodes and to the provider node via the data communication network and is configured for receiving notification of a successful verification of the blockchain contract by the miner nodes. In response to the successful verification, the industrial control system node is further configured for downloading the digital file from a repository coupled to the provider node for distribution to at least one IIoT device of the industrial control system.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

In a typical process control system, a controller sends commands that operate various types of process elements, or assets. The assets may be any mechanical, chemical, electrical, biological, or combined mechanisms or sets of mechanisms that are used to convert energy and materials into value-added products or production. As described above, process automation systems and projects customers have a need for secure delivery to these assets of various digital files (or packages or artifacts) such as software, firmware, security patches, product updates, project files, data, etc. Aspects of the present disclosure use blockchain to establish a trust infrastructure in a distributed way so both providers (vendors or suppliers) of the software and the like and their customers (system owners or asset owners) can securely exchange information in verified mechanisms. Moreover, the trust infrastructure of the present disclosure does not require holding a single authority of trust (e.g., a file hosting service such as Box or Dropbox), which limits the scalability of these software exchange operations.

Figure 1A:
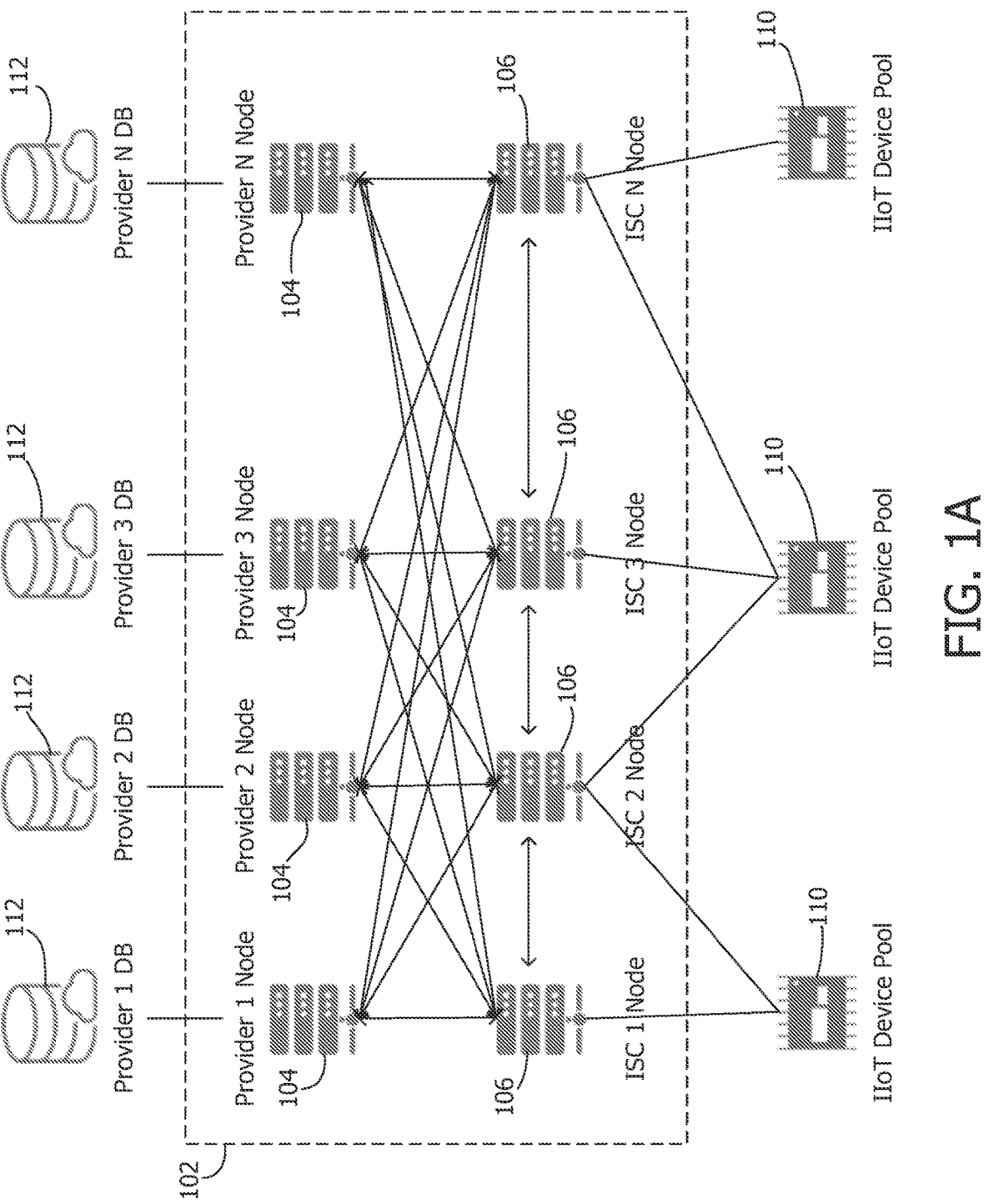
FIGS. 1A and 1B illustrate a blockchain security co-engineering system according to an embodiment.
Figure 1B:
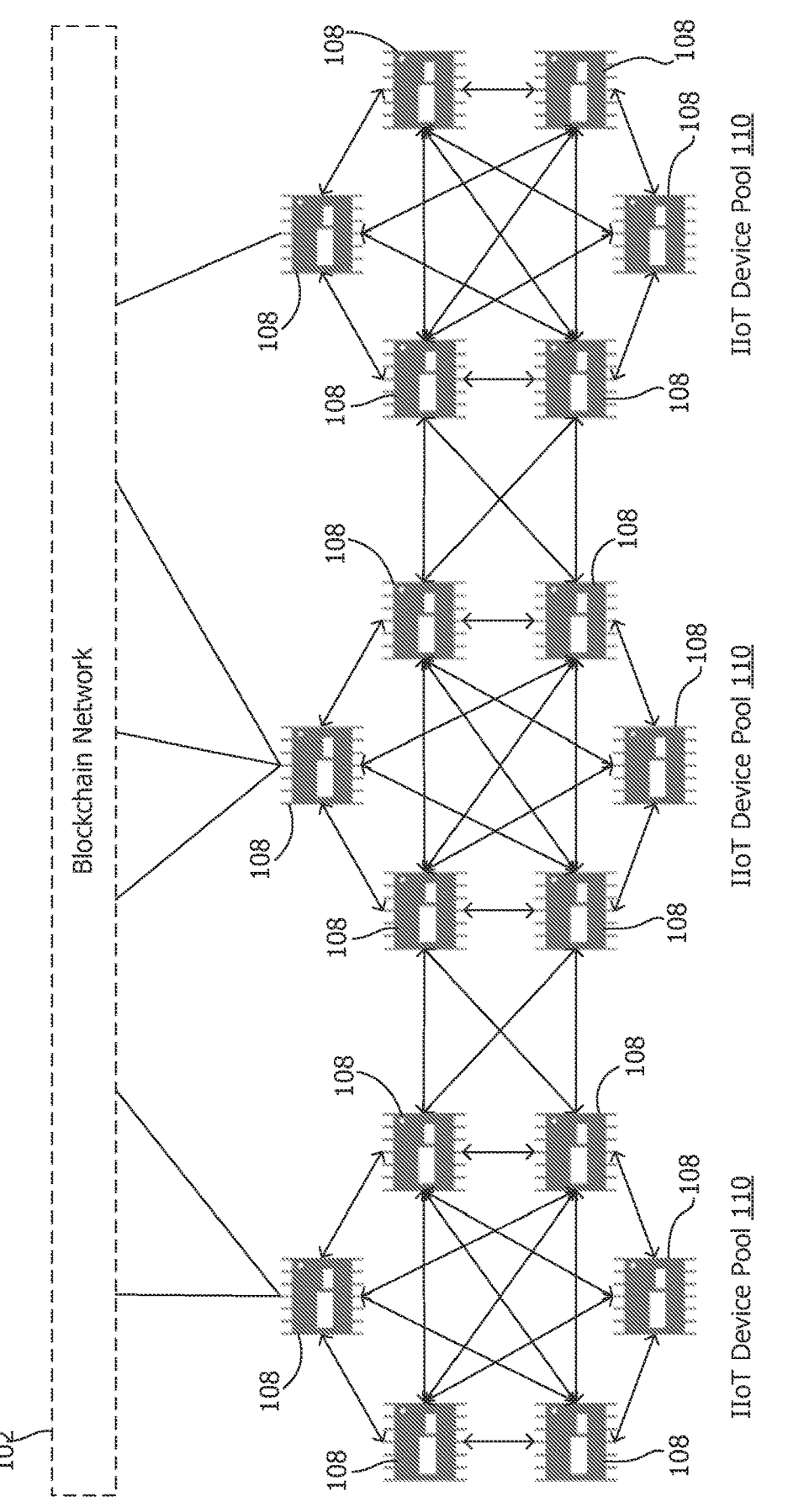

FIGS. 1A and 1B illustrate an example architecture implementing aspects of the present disclosure providing a system for security co-engineering. As shown, a blockchain network 102 comprises one or more provider (or vendor or supplier) nodes 104 and one or more industrial control system (ISC) (or asset owner or system owner or customer) nodes 106. The system relies on using a distributed edger technology (i.e., blockchain) to link both the asset owners and their associated providers. In this instance, the nodes 104, 106 possess credentials proving they are part of the blockchain. An asset owner can have one or multiple providers, and a provider can supply one or multiple asset owners.

FIG. 1A illustrates provider nodes 104 pushing configurations into blockchain network 102 to be verified and validated by the other provider nodes 104 and/or the ISC nodes 106 of the blockchain. Once blockchain network 102 completes the verification, a tamper-proof "smart contract" created for the configuration data is added to the blockchain network's ledger. In an embodiment, the contract is a self-executing program that permits a trusted transaction between one of the provider nodes 104 and a corresponding one of the ISC nodes 106. Once the contract is added to the ledger, the verified and validated provider node 104 checks which of its assets are concerned by this firmware update or other file download. According to aspects of the present disclosure, the assets are Industrial Internet of Things (IIoT) devices 108 (see FIG. 1B) coupled together in one or more IIoT device pools 110. The asset owner 106 then pulls software from a vendor's repository, namely, provider database 112.

In the illustrated embodiment, provider nodes 104 are blockchain network nodes that are responsible for creating data contracts and distributing them to other nodes in the blockchain network 102. In this embodiment, provider nodes 104 do not create a contract. Instead, the provider nodes 104 serve as miners to verify and validate the data contract (see FIG. 2). The provider nodes 104 also have a topology view of the IIoT network and devices. The topology view contains information about the device 108 and its digital twin in the system (e.g., network configuration version, firmware or software version, control application and its version). The ISC nodes 106 are blockchain network nodes that are responsible for receiving and processing the contract after verification. Every ISC node 106 is identified in the blockchain network 102 using a public address (e.g., a public key of a digital wallet). The provider databases 112, or vendor repositories, are databases where providers, vendors, suppliers, etc. publish their work items or the produced data. As shown in FIG. 1B, the IIoT device pools 110 comprise a plurality of interconnected components, namely, IIoT devices 108 of the IIoT system. The IIoT devices 108 can be physical or virtual.

The current problem rests on the fact that an asset owner (or customer) must be able to establish a trust relationship with its providers (or vendors) to verify the origin of their supplied files (e.g., software, patches, updates, etc.) each time a transaction occurs. The fact that the assets owner does not have a strong mechanism to establish trust with third party providers limits the asset owner's capabilities. In other words, a secure trust relationship is needed for the asset owner to ensure that whatever it receives from a third party provider, vendor, supplier, or the like does not create a threat to its operations and therefore to its business. The repetitive nature of these operations from both providers and asset owners (i.e., both sides), where providers deal with multiples asset owners, and vice versa, creates a complex situation that is both labor intensive and risk evasive. According to the present disclosure, all the complexity related to these operations now taken by the blockchain network 102, the risk resilient nature of which substantially eliminates any risk.

Figure 2:
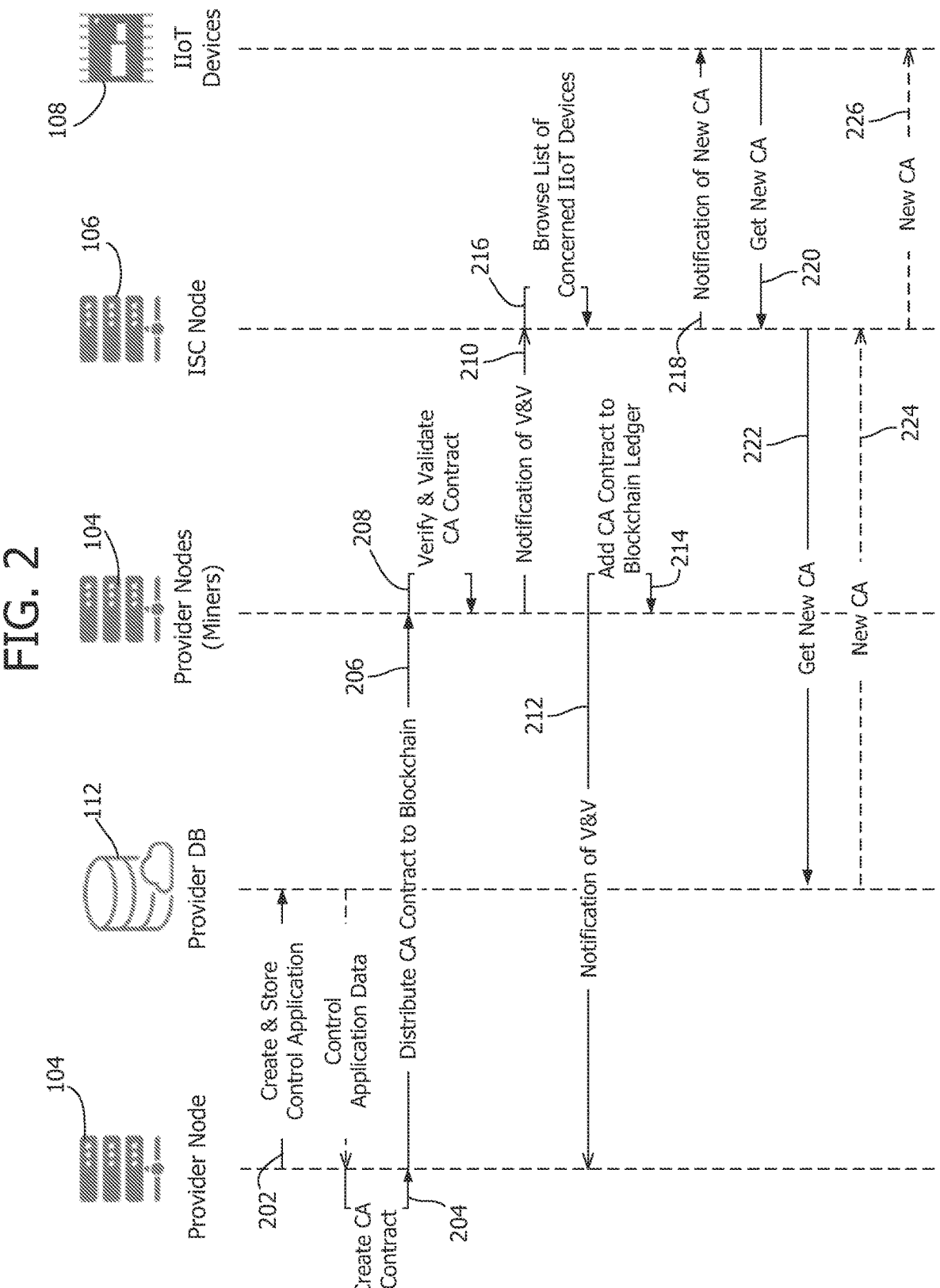
FIG. 2 is an example security update distribution process according to an embodiment.

FIG. 2 illustrates an example process of delivering a control application from a provider to an asset owner. In the example at 202, one of the provider nodes 104 creates a new control application to be executed on an asset such as a programmable logic controller associated with one of the ISC nodes 106. The provider node 104 stores the control application in its provider database 112. At 204, provider node 104 creates a new control application contract that includes the information about the control application (e.g., version, metadata, etc.) and, at 206, deploys the contract into the blockchain network 102 for verification. Other provider nodes 104, serving as miners in blockchain network 102, verify and validate the control application contract at 208. Upon completion of the verification and validation steps, the miners (i.e., the other provider nodes 104 of the blockchain) notify ISC node 106 at 210 and notify provider node 104 at 212 of the verification results. The miners also store the control application contract in the blockchain ledger at 214.

In response verification of the control application contract, ISC node 106 identifies which of the IIoT devices 108 are affected by the control application at 216. Proceeding to 218, after the miners add the control application contract to the blockchain ledger, ISC node 106 notifies all the IIoT devices 108 concerned by this new control application. The concerned IIoT devices 108 in turn send a pull request at 220 to ISC node 106 for retrieving the control application. At 222, asset owner 106 requests the control application and, at 224, asset owner 106 downloads it from provider database 112. The asset owner 104 distributes the control application at 226 to the concerned the IIoT devices 108.

In the conventional model, industrial control system vendors provide the components, and the asset owner is responsible for setting up and configuring the system. The IIoT systems deployment model of the present disclosure is different. In this instance, system configuration includes network configuration, security policies, control strategy, supervision application, operating systems, and firmware deployment. In the ecosystem, vendors and asset owners collaborate to build the system in a continuous model. In other words, the vendors are responsible for providing the best configuration based on their expertise in the system design while the asset owners are responsible for creating strategies based on their needs and sought values. Both providers and asset owners require sharing access to their infrastructure to continue to perform efficiency loops and deploy patch and configuration updates and the like based on the goals defined by the asset owners. For this reason, implementing the disclosed transactional mechanism permits an asset owner to track all changes performed by a vendor and permits a provider to track all changes required by an asset owner.

Aspects of the present disclosure advantageously employ blockchain technology in the case of collaborative engineering and maintenance of IIoT systems. The application of blockchain as infrastructure between vendors and asset owners to co-engineer the IIoT systems provides for secure and trusted data exchanges for IIoT device firmware, operating system patches, control logic, network configuration, security policies, etc.

In operation, a method embodying aspects of the present disclosure securely delivers a control application from a provider to an asset owner of an industrial control system. The method comprises the provider creating a new control application (software or firmware) and storing it in a database associated with the provider. A provider node associated with the provider creates a new control application contract, which includes information about the new control application (e.g., version, metadata, etc.), and deploys the new control application contract into a blockchain network for verification. According to the method, miners (e.g., nodes of other providers) in the blockchain network verify the new control application contract and notify other nodes in the blockchain network of the verification results. The method includes storing the results in the new control application contract in the blockchain ledger followed notifying all IIoT devices concerned by the new control application. The concerned IIoT devices then send a pull request to a node associated with the asset owner. In turn, this node downloads the new control application from the provider's database and distributes it to the concerned IIoT devices. The provider in this method corresponds to or includes a control system provider. Also, the method may be applied to substantially any digital artifact.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method of securely delivering a digital file from a provider to an industrial control system, the industrial control system having a plurality of Industrial Internet of Things (IIoT) devices, the method comprising:

creating a blockchain contract for a provider node associated with the provider, wherein the blockchain contract includes metadata relating to the digital file;

deploying the blockchain contract to a blockchain network for verification;

receiving a verification of the blockchain contract, wherein at least one of a plurality of miner nodes executes the verification, and wherein the miner nodes comprise nodes associated with other providers;

notifying an industrial control system node associated with the industrial control system of a successful verification of the blockchain contract;

responsive to the successful verification, downloading, by the industrial control system node, the digital file from a repository coupled to the provider node; and distributing, by the industrial control system node, the downloaded digital file to at least one of the IIoT devices of the industrial control system.

2. The method of claim 1, further comprising storing information relating to the successful verification of the blockchain contract in a ledger of the blockchain network.

3. The method of claim 1, wherein the digital file comprises a control application.

4. The method of claim 1, wherein the metadata relating to the digital file comprises version information.

5. The method of claim 1, further comprising creating, by the provider, the digital file and storing the digital file in the repository coupled to the provider node.

6. The method of claim 1, further comprising establishing the blockchain network, the blockchain network comprising at least the provider node, the plurality of miner nodes, and the industrial control system node.

7. The method of claim 1, wherein the provider node and the industrial control system node contain credentials proving trusted membership in the blockchain network.

8. The method of claim 1, further comprising identifying one or more of the IIoT devices of the industrial control system selected to receive the digital file and notifying the identified one or more of the IIoT devices of the successful verification of the blockchain contract.

9. The method of claim 8, further comprising sending, by the identified one or more of the IIoT devices, a request to the industrial control system node to pull the digital file, wherein downloading the digital file from the repository coupled to the provider node is further responsive to the request.

10. A system for securely delivering a digital file from one or more providers to an industrial control system, the industrial control system having a plurality of Industrial Internet of Things (IIoT) devices, the system comprising:

a plurality of miner nodes coupled to each other via a data communication network and forming a blockchain network;

a provider node associated with one of the one or more providers, the provider node coupled to the miner nodes via the data communication network, the provider node configured for creating a blockchain contract having metadata relating to the digital file to be delivered and deploying the blockchain contract to the miner nodes for verification;

an industrial control system node associated with the industrial control system, the industrial control system node coupled to the miner nodes and to the provider node via the data communication network, the industrial control system node configured for receiving notification of a successful verification of the blockchain contract by the miner nodes, responsive to the successful verification, downloading the digital file from a repository coupled to the provider node, and distributing the digital file to at least one of the IIoT devices of the industrial control system.

11. The system of claim 10, further comprising a ledger of the blockchain network storing information relating to the successful verification of the blockchain contract.

12. The system of claim 10, wherein the digital file comprises a control application.

13. The system of claim 10, wherein the metadata relating to the digital file comprises version information.

14. The system of claim 10, further comprising a repository coupled to the provider node storing the digital file.

15. The system of claim 10, wherein the blockchain network comprises at least the provider node, the miner nodes, and the industrial control system node.

16. The system of claim 15, wherein the provider node and the industrial control system node contain credentials proving trusted membership in the blockchain network.

17. The system of claim 10, wherein the miner nodes comprise nodes associated with other providers and wherein the miner nodes execute the verification of the blockchain contract.

18. The system of claim 10, wherein the industrial control system node is configured for identifying one or more of the IIoT devices of the industrial control system selected to receive the digital file and notifying the identified one or more of the IIoT devices of the successful verification of the blockchain contract.

19. The system of claim 18, wherein the industrial control system node is configured for receiving a request from the identified one or more of the IIoT devices to pull the digital file, and wherein the industrial control system node downloads the digital file from the repository coupled to the provider node in response to the request.

* * * * *